United States Patent [19]

Mammone

[11] Patent Number: 4,891,733

[45] Date of Patent: Jan. 2, 1990

[54] THIN FILM ALL POLYMER CAPACITOR AND METHOD OF MAKING

[75] Inventor: Robert J. Mammone, South Plainfield, N.J.

[73] Assignee: The United States of America as represented by the Secretary of the Army, Washington, D.C.

[21] Appl. No.: 351,131

[22] Filed: May 11, 1989

[51] Int. Cl.$^4$ .......................... H01G 1/01; H01G 7/00
[52] U.S. Cl. ...................................... 361/323; 29/25.42
[58] Field of Search ........................ 361/323; 29/25.42

[56] References Cited

U.S. PATENT DOCUMENTS

| | | |
|---|---|---|
| 3,523,225 | 8/1970 | Netherwood et al. ......... 361/323 X |
| 3,649,892 | 3/1972 | Booe ................................ 361/323 X |
| 3,978,378 | 8/1976 | Tigner et al. ........................ 361/323 |

*Primary Examiner*—Donald A. Griffin
*Attorney, Agent, or Firm*—Michael J. Zelenka; Roy E. Gordon

[57] ABSTRACT

An all polymer, electrochemically formed, thin film capacitor is provided without use of any metal foil and found to yield reasonable capacitance values. The capacitor includes an electrochemically formed insulating polymer sandwiched between two electrochemically formed conductive polymers.

8 Claims, No Drawings

THIN FILM ALL POLYMER CAPACITOR AND METHOD OF MAKING

The invention described herein may be manufactured, used, and licensed by or for the Government for governmental purposes without the payment to me of any royalty thereon.

This invention relates in general to a thin film all polymer capacitor and to its method of making, and in particular to such a capacitor including a flat layer of an electrochemically formed insulating polymer sandwiched between two flat layers of electrochemically formed conducting polymers.

BACKGROUND OF THE INVENTION

Preparation of thin film capacitors has generally required that an insulating free standing dielectric film be sandwiched between thin metal foils. The dielectric film and metal foil have then been spirally wound together to produce a device. One major disadvantage of this technique has been that metal foils use a large percentage of the available weight and volume in the fabricated device. Since energy capacity of the device is directly related to surface areas of insulating dielectric, a reduction in the volume of the contact through use of vanishingly thin, conductive polymeric films should increase the energy capacity of the resulting device. In addition, since the density of conducting polymers are generally between 1 and 1.5 g/cm while aluminum is 2.7 g/cm, a substantial reduction in energy capacity per unit weight can also be realized. Therefore, if an insulating dielectric can be readily placed on a thin conductive material, this would be of great interest.

Another major disadvantage of the standard technique has been that pinholes in the insulating dielectric can have catastrophic effects on the resulting device. That is, when the capacitor is stressed with a high voltage and a pinhole is present, a tremendous current density passes through the pinhole causing heat generation and subsequent deterioration of the insulating dielectric. However, if the conductor were a conducting polymer, heat build-up from the current would quickly flash off the conducting polymer, shut off the current and isolate the pinhole. This self-healing process from pinholes would also be of great interest.

SUMMARY OF THE INVENTION

The general object of this invention is to provide a thin film all polymer capacitor that can be made without the use of any metal foil. A more particular object of the invention is to provide such a capacitor that will be lightweight and easily produced. A further object of the invention is to provide such a capacitor that will be substantially free from stressing by pinholes.

It has now been found that the aforementioned objects can be attained using a flat layer of an electrochemically formed insulating polymer sandwiched between two flat layers of electrochemically formed conducting polymer.

The newly designed, all polymer construction enables very thin, lightweight capacitors to be easily produced. A practical capacitor uses poly-n-methylpyrrole (PNP) as the insulating dielectric sandwiched between two sheets of conductive polypyrrole (PP) to form the capacitor.

DESCRIPTION OF THE PREFERRED EMBODIMENT

A conducting flat layer of PP is first electrochemically prepared on an indium tin oxide coated glass electrode at a constant current in an aqueous solution of 0.1 molar sodium dodecylbenzenesulfonate and 0.1 mole of pyrrole. The resulting polymer is peeled off the electrode and washed in water. A flat insulating layer of (PNP) is then electrochemically deposited on the conducting polymer at a constant current in an aqueous solution of 0.1 molar sodium sulfate and 0.05 molar N-methyl pyrrole. The resulting deposit is then washed in distilled water and dried under dynamic vacuum. A second conducting deposit is then prepared as above and mechanically pressed onto the other side of the deposit.

As a result of carrying out the foregoing embodiment, the following experimental results are shown for a laboratory scale device

| Capacitor | Capacitance | Loss |
|---|---|---|
| PP/PNP/PP ($A = 2.0$ cm$^2$) | 130.19 pF/100 Hz | 7.638/100 Hz |
|  | 143.29 pF/1k Hz | 0.8234/1k Hz |
|  | 141.55 pF/10k Hz | 0.0453/10k Hz |

PP = polypyrrole ($C_{12}H_{25}C_6H_4SO_3^-$ doped-conductive)
PNP = poly-n-methyl-pyrrole ($SO_4^{-2}$ doped-insulating).

The results clearly show that a working device can be prepared by this method.

Dielectric breakdown of the device was also investigated. In this connection it was found that a PP/PNP/PP capacitor prepared for test purposes held off a voltage of approximately 100V before dielectric breakdown occurred. This result indicates that the electrochemically formed insulator layer is truly acting as a static energy storage device.

In the aforedescribed embodiment, the thickness of the prepared capacitor is about 110 microns of which 15 microns is the thickness of the insulating layer and 45 microns is the thickness of each conductive layer.

I wish it to be understood that I do not desire to be limited to the exact details as described for obvious modifications will occur to a person skilled in the art.

What is claimed is:

1. Method of making a thin film all polymer capacitor comprising preparing a thin, conductive polymer layer by electrochemical technique, electochemically polymerizing an insulating layer onto the conductive layer and mechanically pressing a second conductive polymer layer onto the other side of the insulating layer.

2. Method of making a thin film all polymer capacitor according to claim 1 wherein the conductive polymer is polypyrrole.

3. Method of making a thin film all polymer capacitor according to claim 1 wherein the insulating polymer is poly-n-methyl-pyrrole.

4. Method of making a thin film all polymer capacitor according to claim 1 wherein the conductive polymer is polypyrrole and the insulating polymer is poly-n-methyl-pyrrole.

5. A thin film, all polymer capacitor comprising an electrochemically formed insulating polymer sandwiched between two electochemically formed conducting polymers.

6. A thin film all polymer capacitor according to claim 5 wherein the conductive polymer is polypyrrole.

7. A thin film all polymer capacitor according to claim 5 wherein the insulating polymer is poly-n-methyl-pyrrole.

8. A thin film all polymer capacitor according to claim 5 wherein the conducting polymer is polypyrrole and the insulating polymer is poly-n-methyl-pyrrole.

* * * * *